US011502596B2

(12) United States Patent
Mazumder et al.

(10) Patent No.: US 11,502,596 B2
(45) Date of Patent: Nov. 15, 2022

(54) THREE-PHASE DIFFERENTIAL MODE CONVERTER

(71) Applicant: THE BOARD OF TRUSTEES OF THE UNIVERSITY OF ILLINOIS, Urbana, IL (US)

(72) Inventors: Sudip K. Mazumder, Chicago, IL (US); Moien Mohamadi, Sanandaj (IR); Nikhil Kumar, New Delhi (IN)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 3 days.

(21) Appl. No.: 17/264,110

(22) PCT Filed: Oct. 28, 2020

(86) PCT No.: PCT/US2020/057743
§ 371 (c)(1),
(2) Date: Jan. 28, 2021

(87) PCT Pub. No.: WO2021/154356
PCT Pub. Date: Aug. 5, 2021

(65) Prior Publication Data
US 2022/0060102 A1 Feb. 24, 2022

Related U.S. Application Data

(60) Provisional application No. 62/967,695, filed on Jan. 30, 2020.

(51) Int. Cl.
*H02M 1/32* (2007.01)
*H02M 3/00* (2006.01)
*H02M 1/42* (2007.01)

(52) U.S. Cl.
CPC ............. *H02M 1/32* (2013.01); *H02M 3/005* (2013.01); *H02M 1/4216* (2013.01)

(58) Field of Classification Search
CPC ...... H02M 1/4216; H02M 1/32; H02M 1/325; H02M 7/17; H02M 7/23; H02M 7/2173
See application file for complete search history.

(56) References Cited

U.S. PATENT DOCUMENTS 5,550,697 A * 8/1996 Green ............... H02M 7/53871
363/56.02
8,169,797 B2 5/2012 Coccia et al.
(Continued)

FOREIGN PATENT DOCUMENTS

CN 108282035 A 7/2018
DE 102014219909 A1 4/2016
(Continued)

OTHER PUBLICATIONS

"Electric Vehicle Grid Integration in the U.S., Europe, and China: Challenges and Choices for Electricity and Transporation Policy", The Regulatory Assistance Project, The International Council on Clean Transporation and M.J. Bradley & Associates LLC, 69 pp. (Jul. 2013).
(Continued)

*Primary Examiner* — Alex Torres-Rivera
(74) *Attorney, Agent, or Firm* — Marshall, Gerstein & Borun LLP

(57) ABSTRACT

A system for charging a battery includes three sub-modules, each receiving a respective phase of a three-phase alternating current (AC) signal. The three sub-modules cooperate to transform the respective phases of the three-phase AC signal to a direct current (DC) signal by passing the respective phases of the three-phase AC signal through a respective semiconductor device configured to discontinuously modulate the respective phase of the three-phase AC signal to (Continued)

convert it to a DC signal provided to the battery to charge the battery.

19 Claims, 14 Drawing Sheets

(56) References Cited

U.S. PATENT DOCUMENTS

| | | | |
|---|---|---|---|
| 9,379,640 B2 | 6/2016 | Mazumder | |
| 9,991,821 B2 | 6/2018 | Freeman et al. | |
| 2012/0071956 A1* | 3/2012 | Stevenson | H03H 1/0007 607/116 |
| 2012/0120697 A1* | 5/2012 | Cuk | H02M 1/4258 363/126 |
| 2012/0242299 A1* | 9/2012 | Xu | H02M 1/4225 323/210 |
| 2017/0047744 A1* | 2/2017 | Kim | H02M 1/42 |
| 2017/0133946 A1* | 5/2017 | Wagoner | H02M 7/537 |
| 2019/0067932 A1* | 2/2019 | Li | H02H 3/202 |
| 2020/0052608 A1* | 2/2020 | Bala | H02M 1/088 |
| 2020/0244204 A1* | 7/2020 | Wang | H02P 29/0241 |
| 2020/0412261 A1* | 12/2020 | Fujimoto | H01F 27/40 |
| 2021/0399624 A1* | 12/2021 | Brown | H02J 7/02 |

FOREIGN PATENT DOCUMENTS

| | | |
|---|---|---|
| DE | 102016209872 A1 | 12/2017 |
| EP | 3471257 A1 | 4/2019 |
| JP | 6637552 B2 | 1/2020 |

OTHER PUBLICATIONS

"Lessons from Early Deployments of electric Vehicle Charging Stations: Case Studies from the Northeast and Mid-Atlantic Regions", Georgetown Climate Center, Transportation & Climate Initiative, 56 pp. (May 2013).

"Plugged In: How Americans Charge Their Electric Vehicles, Findings from the Largest Plus-In Vehicle Infrastructure Demonstration in the World", Idaho National Laboratory, 24 pp. (2015).

Clint et al., Considerations for Corridor Direct Current Fast Charging Infrastructure in California, California Energy Commission, 60 pp.(2015).

International Application No. PCT/US2020/057743, International Search Report and Written Opinion, dated Jun. 16, 2021.

Kumar et al., Experimental validation of single-stage three-phase non-isolated cuk rectifier, Energy Conversion Congress and Exposition 2019 (Jul. 2019).

Kumar et al., Passive damping optimization of the integrated-magnetics based differential-mode cuk rectifier, IEEE Transactions on Power Electronics, vol. 35, Issue 10, Mar. 19, 2020.

Kumar et al., SiC DC fast charger control for electric vehicles, 2018 IEEE Energy Conversion Congress and Exposition (ECCE) (Sep. 23-27, 2018).

Lu et al., Device and system-level transient analysis in a modular designed sub-MW EV fast charging station using hybrid GaN HEMTs + Si MOSFETs, IEEE Journal of Emerging and Selected Topics in Power Electronics, 7(1):143-56 (2019).

Majo et al., Large-signal feedback control of a bidirectional coupled-inductor cuk converter, IEEE Transactions on Industrial Electronics, 39(5):429-35 (1992).

Mohamadi et al., Integrated magnetics design for a three-phase differential-mode rectifier, IEEE Transactions on Power Electronics, vol. 36, Issue 9 (Mar. 17, 2021).

Myrzik, Topologische Untersuchungen zur Anwendung von tief/-hochsetzenden Stellern für Wechselrichter, Kassel University Press, pp. 1-175 (2001).

Smith et al., Costs associated with non-residential electric vehicle supply equipment, U.S. Department of Energy, 43 pp. (2015).

* cited by examiner

THREE-PHASE DIFFERENTIAL MODE CONVERTER

This invention was made with government support under grant number DE-AR0000903 awarded by The Advanced Research Projects Agency-Energy (ARPA-E). The government has certain rights in this invention.

TECHNICAL FIELD

The present disclosure relates to charging systems for battery systems and, in particular, to improved systems and methods for charging batteries of electric vehicles.

BACKGROUND

Electric vehicles (EVs) are becoming increasingly competitive in the marketplace compared to traditional fossil fuel vehicles. In this regard, heightened awareness about climate change, and the role played by fossil fuels in driving climate change, intensifies the necessity and desirability of alternative solutions to personal and public transportation and, as a result, significant research is being devoted to adapting EVs toward replacing traditional fuel vehicles. Price, efficiency, recharge-time, and range are all challenges in the industry at present, and these challenges are driving the development of direct current (DC) fast-charging systems to overcome these hurdles. However, presently available DC fast-charging systems for EVs are often inefficient (i.e., lossy) and physically bulky.

The systems and methods disclosed herein provide solutions to these problems and others.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one aspect, there is a system for charging a battery. The system includes a power module having an input configured to receive alternating current (AC) from a three-phase AC power source. A first sub-module receives a first phase of an AC signal provided by the AC power source, and modulates first phase of the AC signal to provide a first output signal, while second and third sub-modules receive respective second and third phases of the AC signal provided by the AC power source, and modulate, respectively, the second and third phases of the AC signal to provide respective second and third output signals. An output delivers to a battery, as a direct current (DC) output, the combined first, second, and third output signals. The first, second, and third sub-modules are configured as a differential mode converter.

In embodiments, the power module performs single stage conversion of the AC signal to the DC signal. In some embodiments, the power module converts the AC signal to the DC signal without employing a transformer, though in others, the power module includes a transformer. In embodiments, each of the sub-modules includes a semiconductor switching device modulating the respective phase of the AC signal using discontinuous modulation. An air-gapless integrated magnetic array is employed in embodiments.

In embodiments, the power module includes fault response circuitry configured to coordinate a fault control response of AC-side protection, DC-side protection, and protection of switching components performing the modulation. The fault response circuitry includes first protection components configured to monitor the switching components, to cause the switching components to stop operating when over-voltage, undervoltage, and/or overcurrent conditions are detected or when a global fault signal is detected, and to output a first fault signal when any of the overvoltage, undervoltage, and/or overcurrent condition is detected. The fault response circuitry also includes second protection components configured to monitor the AC-side of the power module between the AC power source and the switching components of the first, second, and third sub-modules, to cause one or more AC-side protection components to activate when an AC-side fault is detected or when the global fault signal is detected, and to output a second fault signal when the AC-side fault is detected. Further, the fault response circuitry includes third protection components configured to monitor the DC-side of the power module between the first, second, and third sub-modules and the battery, to cause one or more DC-side protection components to activate when a DC-side fault is detected or when the global fault signal is detected, and to output a third fault signal when the DC-side fault is detected. The coordination circuitry is configured to receive the first, second, and third fault signals, and to output the global fault signal when any of the first, second, or third fault signals is detected.

Advantages will become apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

A three-phase differential-mode converter-based battery charging technology is described herein. As will be described, the battery charging technology includes, in various embodiments, a variety of novel components and features, including integrated magnetics, systems for coordinating the protection of equipment and people during operation, loss mitigation technology, and modular scalability.

Figure 1:
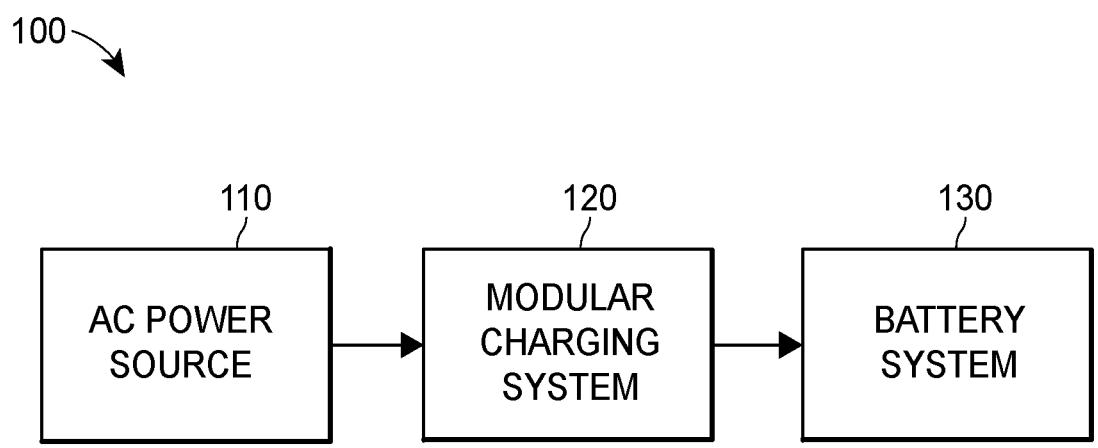
FIG. 1 is a high-level block diagram placing in context the modular charging system of the present description.

FIG. 1 depicts at a high level the presently described modular charging system environment 100. Within the environment 100, a three-phase alternating current (AC) power source 110 is coupled to the modular charging system 120, which converts the AC power signal provided from the AC power source 110 to direct current (DC) that is provided to a battery system 130 to charge the battery system 130. While depicted in FIG. 1, and throughout the present specification, as a single element, the battery system 130 may itself include a plurality of discrete battery elements that are electrically coupled together to provide the voltages and currents desired and/or required by an energy consumer (e.g., an electric vehicle) coupled to the battery system 130. The battery system 130 may also include additional circuitry for controlling the charging and/or discharging of the battery system 130, for maintaining safe operation of the battery system 130, and the like, but these systems are not the concern of the present specification and are not described herein.

Figure 2:
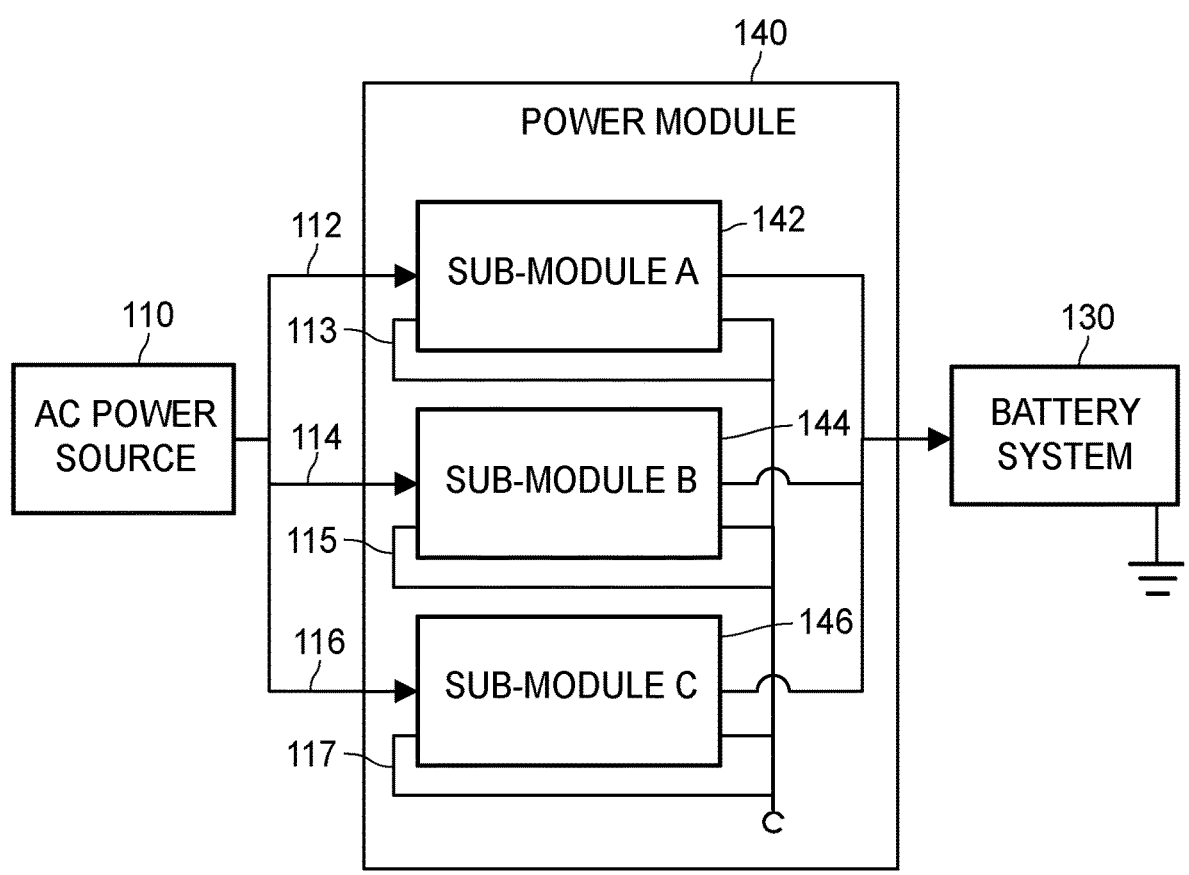
FIG. 2 is a block diagram of a power module in accordance with the present description placed in the context of FIG. 1.

FIG. 2 depicts the modular charging system 120 in slightly more detail. A single, differential-mode conversion power module 140 is depicted in the modular charging system 120. As can be seen from FIG. 2, the differential-mode conversion power module 140 (hereinafter referred to, for brevity, as a "power module") is itself made up of three sub-modules 142, 144, and 146. The AC power source 110 is a three-phase power source, as is generally understood. Each of the sub-modules 142-146 is electrically coupled to a respective phase of the three-phase system. That is, the sub-module A 142 receives a first phase of the electrical power provided by the AC power source 110 via a first input connection 112, the sub-module B 144 receives a second phase of the electrical power provided by the AC power source 110 via a second input connection 114, and the sub-module C 146 receives a third phase of the electrical power provided by the AC power source 110 via a third input connection 116. As will be understood by those of ordinary skill in the art, each of the first, second, and third connections 112, 114, 116 has two inputs, as necessary to establish a voltage differential. The respective second inputs 113, 115, 117 of each of the first, second, and third connections 112, 114, 116 is common, as depicted in FIG. 2. Each of the sub-modules 142-146 receives the AC signal via the respective connections 112-117, switches or modulates the AC line voltage, and outputs a corresponding switched output signal such that when the respective switched output signals are combined, they result in a DC signal output to the battery system 130.

Figure 3:
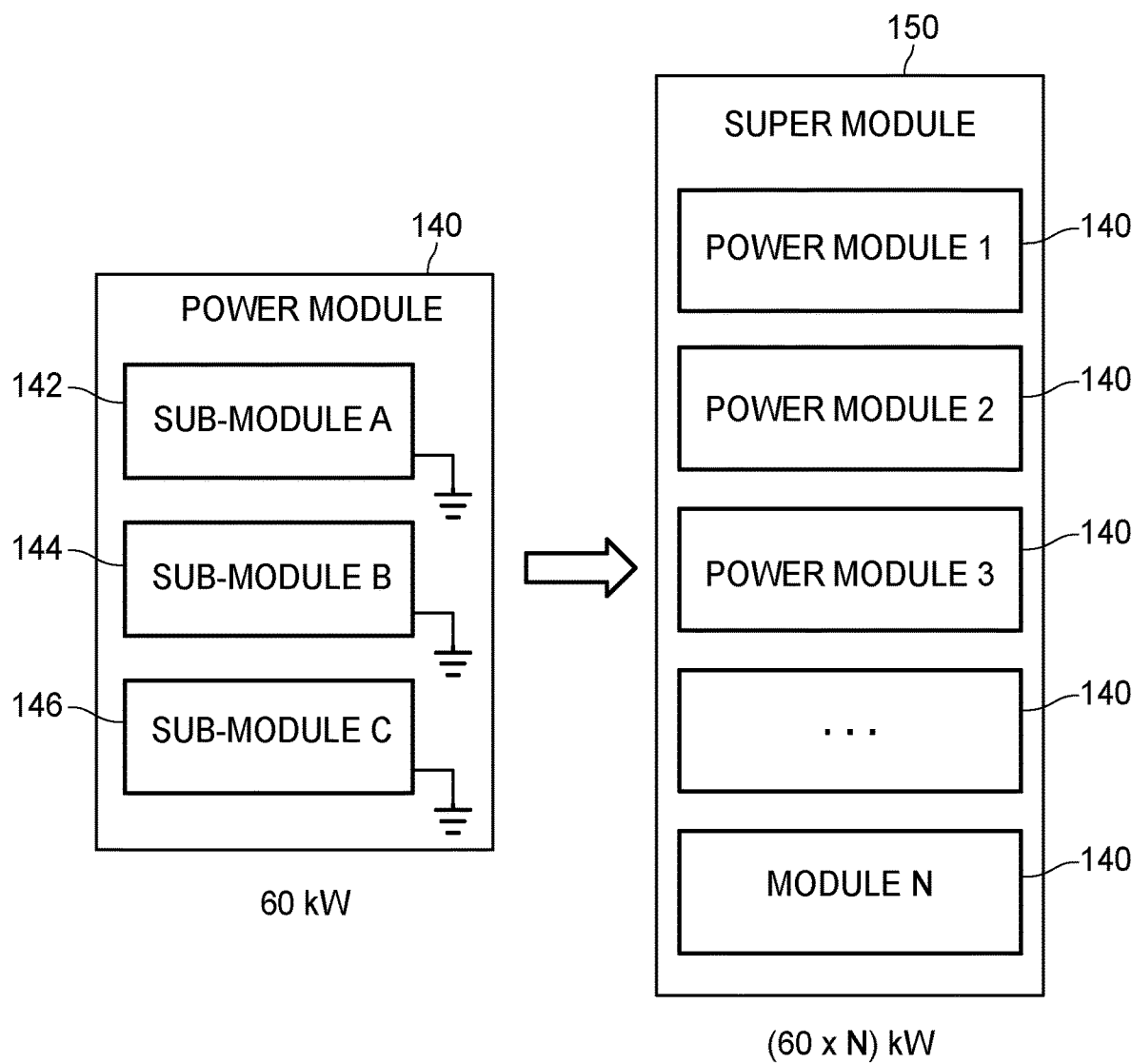
FIG. 3 is a block diagram illustrating the modularity of the described system.

The power module 140 can be electrically coupled to additional power modules 140 for scalability, as illustrated in FIG. 3. Each of the power modules 140 can produce, for example, 60 kW of power from a 480 V, three-phase AC source. The power modules 140 may be coupled to one another as a "super module" 150 to produce correspondingly large power outputs. That is, a number, N, of power modules 140, each coupled to the AC power source 110, may produce (60×N) kW of power when combined. This scalability allows the modular charging system 120 to be compatible with power requirements of various operations (e.g., with respect to electric vehicle charging, for lower power L1-L2 operation, higher power L3-L5 operation, etc.). Additionally, while described herein as coupled to a 480 V, three-phase AC power source 110, the scalability of the modular charging system 120 is also compatible with systems of other voltages.

Figure 4A:
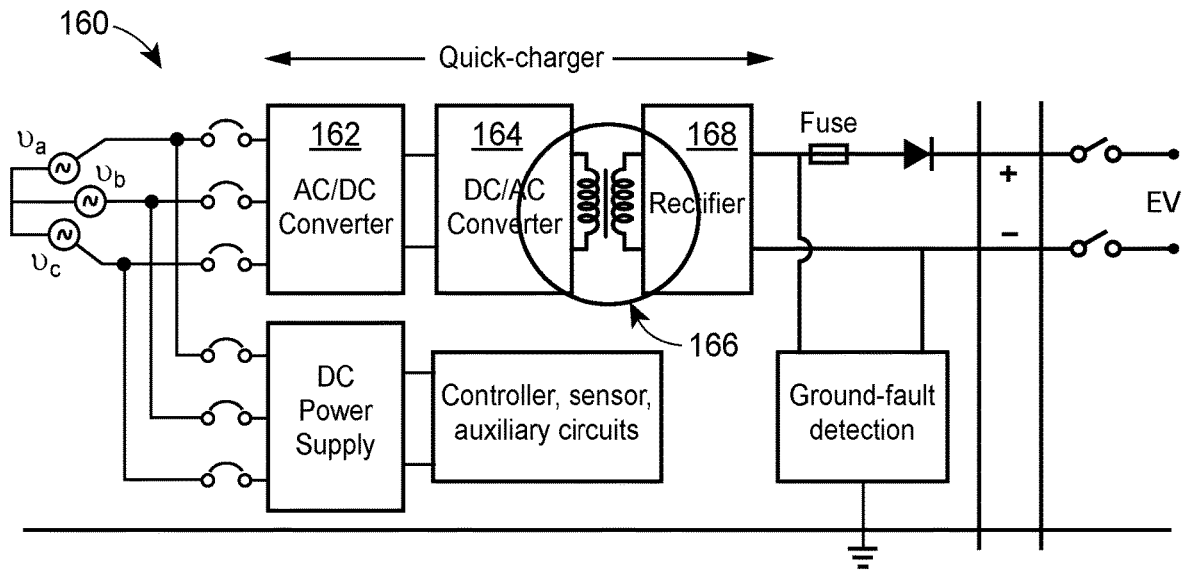
FIG. 4A is a block diagram of a prior art charging system using multistage AC-to-DC power conversion.
Figure 4B:
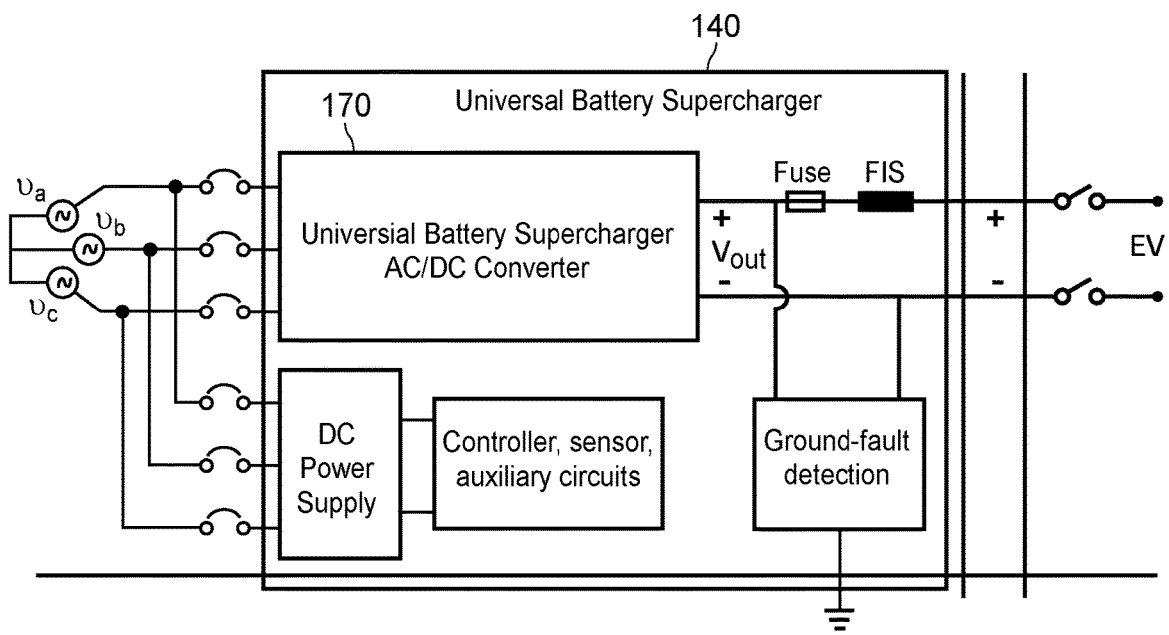
FIG. 4B is a block diagram of the novel charging system implement single stage AC-to-DC power conversion.

FIGS. 4A and 4B illustrate, at a high level, one distinction of the presently described embodiments with respect to the prior art. FIG. 4A shows a block diagram of a prior art charging system 160. The prior art charging system 160 includes multiple power conversion stages and, in particular, includes an AC-to-DC conversion circuit 162, that receives three-phases of an AC power signal, and outputs a DC signal to a DC-to-DC conversion circuit 164, high-frequency transformer isolation 166, and a rectification circuit 168. In contrast, FIG. 4B shows a single-stage power conversion circuit 170 in the power module 140 in accordance with the presently contemplated embodiments. The single-stage power conversion circuit includes the sub-modules 142-146.

Figure 5A:
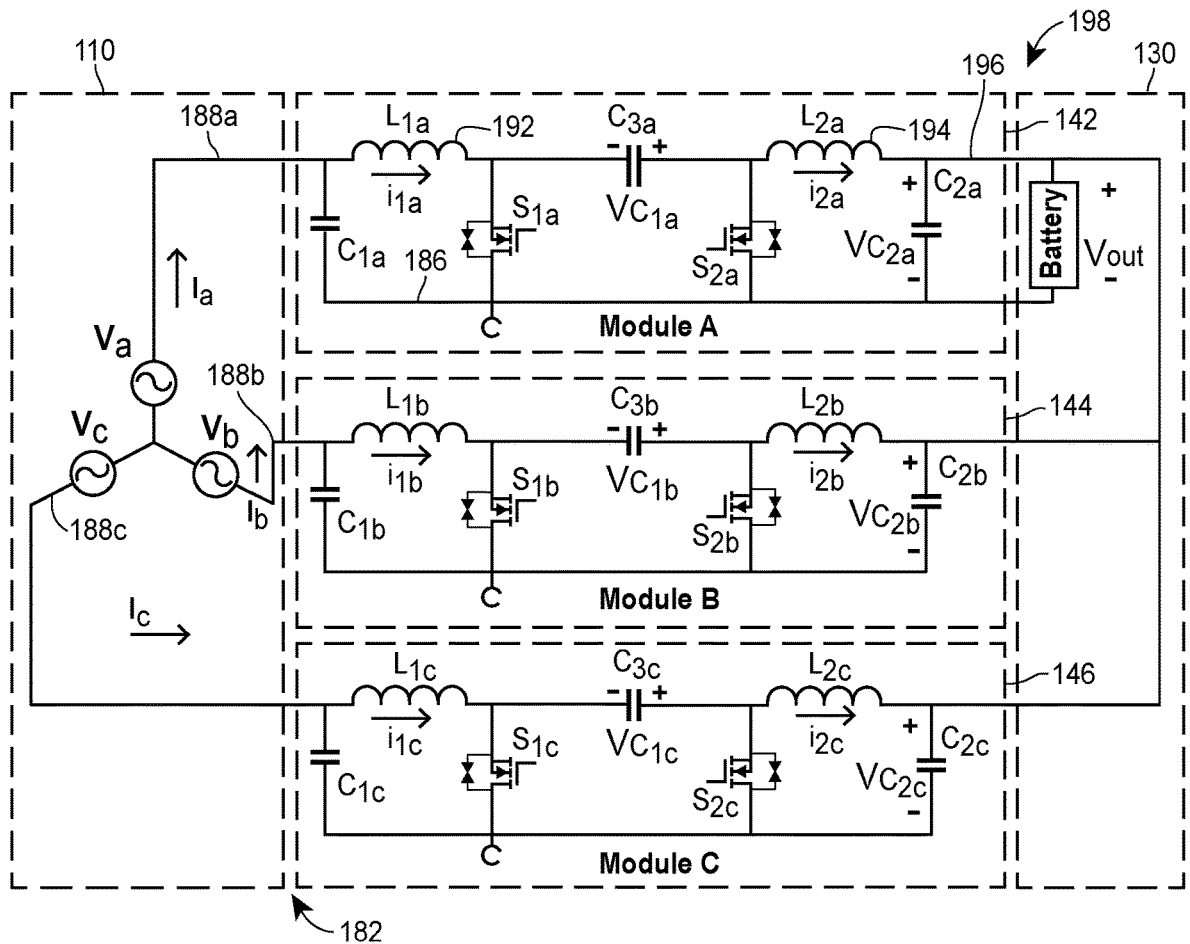
FIG. 5A is a schematic diagram of an example embodiment of a differential mode converter module.

Each of the sub-modules 142-146 in the power module 140 is configured in a similar manner. FIG. 5A depicts a schematic diagram of a representative power module 175 and example sub-modules 142-146. Each sub-module 142-146 includes an input 182 comprising a positive terminal 184 and a common terminal 186. The positive terminal 184 is electrically coupled to a positive side 188 of a corresponding phase of the AC power source 110, while the common terminal 186 is electrically coupled to the respective common terminals 186 of the other sub-modules. Each sub-module 142-146 includes two switches (e.g., $S_1$ and $S_2$) that cooperate to perform high-frequency switching (modulation) of the line signal. In embodiments, the switches $S_1$ and $S_2$ cooperate to perform discontinuous modulation and, specifically, to limit the active duration of the sub-module 142-146 to ⅔ of the line cycle, resulting in a reduction of conduction and switching loss and, consequently, boosting the efficiency.

Figure 5B:
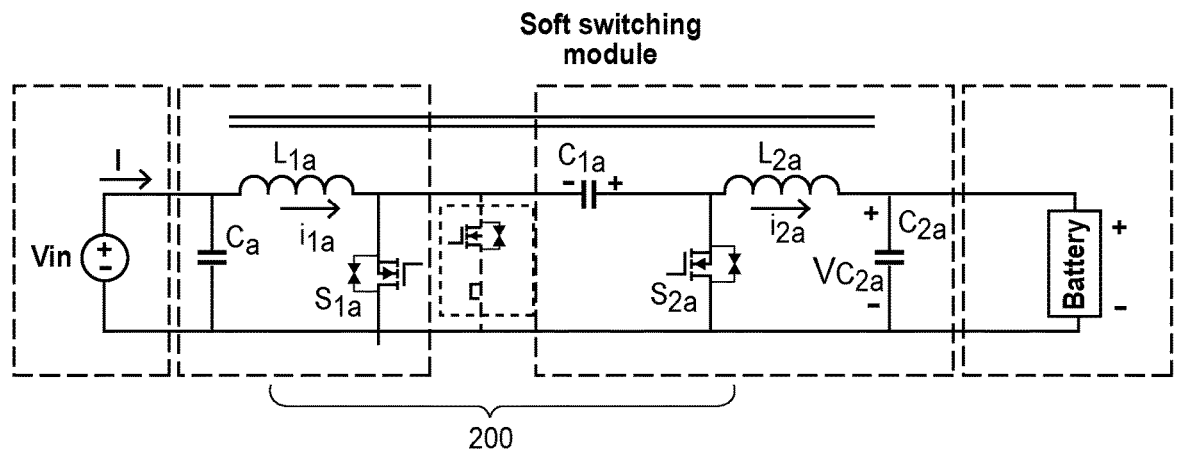
FIG. 5B is a schematic diagram of an alternative embodiment of an example sub-module of the power module of FIG. 5A.

FIG. 5B depicts a schematic diagram of an alternative embodiment of the power module 175 and, specifically, an embodiment in which each of the sub-modules 142-146 is configured as the sub-module 180 (e.g., one of the sub-modules 142-146) depicted in the figure. The sub-module 180 includes an input 182 comprising a positive terminal 184 and a common terminal 186. The positive terminal 184 is electrically coupled to a positive side 188 of a corresponding phase of the AC power source 110, while the common terminal 186 is electrically coupled to a common node 190 of the three-phase AC power source 110. The sub-module 180 includes a soft-switching module 200 that performs high-frequency switching (modulation) of the line signal. In embodiments, the soft-switching module 200 performs discontinuous modulation and, specifically, limits the active duration of the soft-switching module 200 to ⅔ of the line cycle, resulting in a reduction of conduction and switching loss and, consequently, boosting the efficiency. In some embodiments, the soft-switching module 200 is implemented as a SiC JFET cascode circuit. In some embodiments, the soft-switching module 22 is implemented as a SiC MOSFET circuit.

In embodiments, as depicted in FIGS. 5A and 5B, the sub-modules 142-146 and 180 each include a capacitor $C_1$ coupled between the positive terminal 184 of the corresponding phase of the three-phase source and the common node 190, and a capacitor $C_1$ coupled between a positive terminal 196 of the battery or load 103. A capacitor $C_3$ is coupled in series between two inductors, $L_1$ and $L_2$. The inductor $L_1$ is coupled at one terminal to a first terminal of the capacitor $C_3$ and at the other terminal to the capacitor $C_1$ and the positive terminal 184. The inductor $L_2$ is coupled at one terminal to a second terminal of the capacitor $C_3$ and at the other terminal to the capacitor $C_2$ and the positive terminal 196 of the battery or load 103. As such, the inductors $L_1$ and $L_2$ are in series with the capacitor $C_3$. The switch $S_1$ is coupled at a first terminal to the inductor $L_1$ and the capacitor $C_3$, and at a second terminal to the common node 190, as depicted in FIGS. 5A and 5B. The switch $S_2$ is coupled at a first terminal to the inductor $L_2$ and the capacitor $C_3$, and at a second terminal to the common node 190, as depicted in FIGS. 5A and 5B.

Figure 6A:
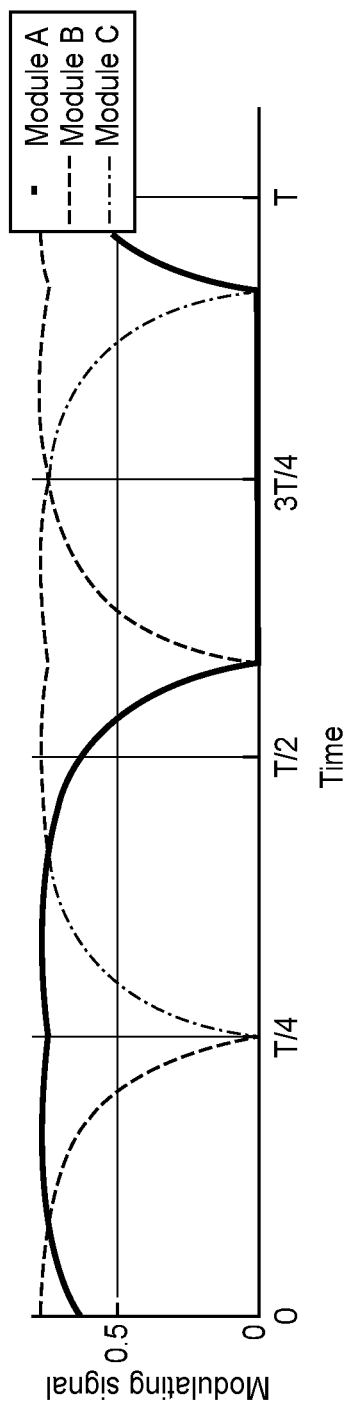
FIG. 6A is a graph showing the output signals of each of the three sub-modules using discontinuous modulation according the present description.
Figure 6B:
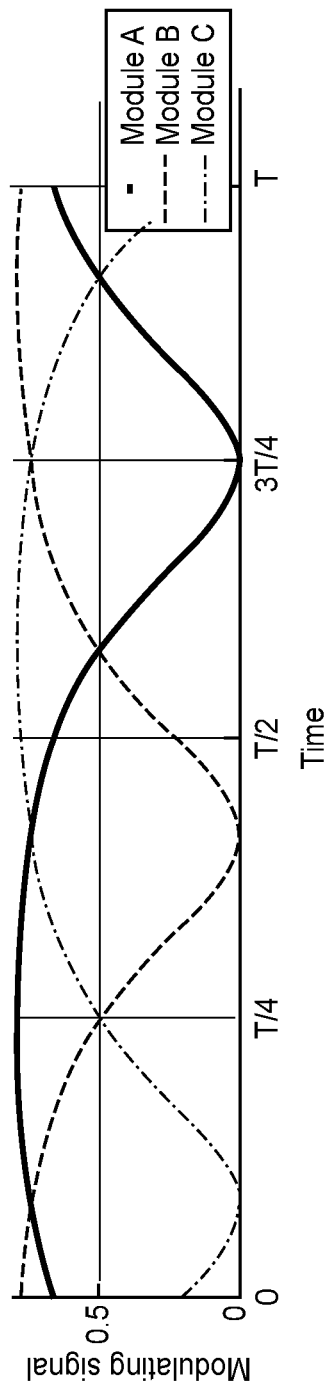
FIG. 6B is a graph showing the output signals of each of three sub-modules using continuous modulation according to the prior art.

Turning briefly to FIGS. 6A and 6B, the signals output by each of the three modules (i.e., one phase per module) are shown as they result from the discontinuous modulation scheme (FIG. 6A) and from the prior art continuous modulation scheme (FIG. 6B). In FIG. 6A, it is evident that each phase is results in no output signal for one third of the respective line cycle, as a result of the discontinuous switching in which one of the three sub-modules, at any given time, is not performing high-frequency switching. By contrast, in FIG. 6B it is evident that each phase results in an output signal for almost the entire line cycle, expect for momentarily at its minimum value, because high frequency switching is occurring continuously.

Figure 7A:
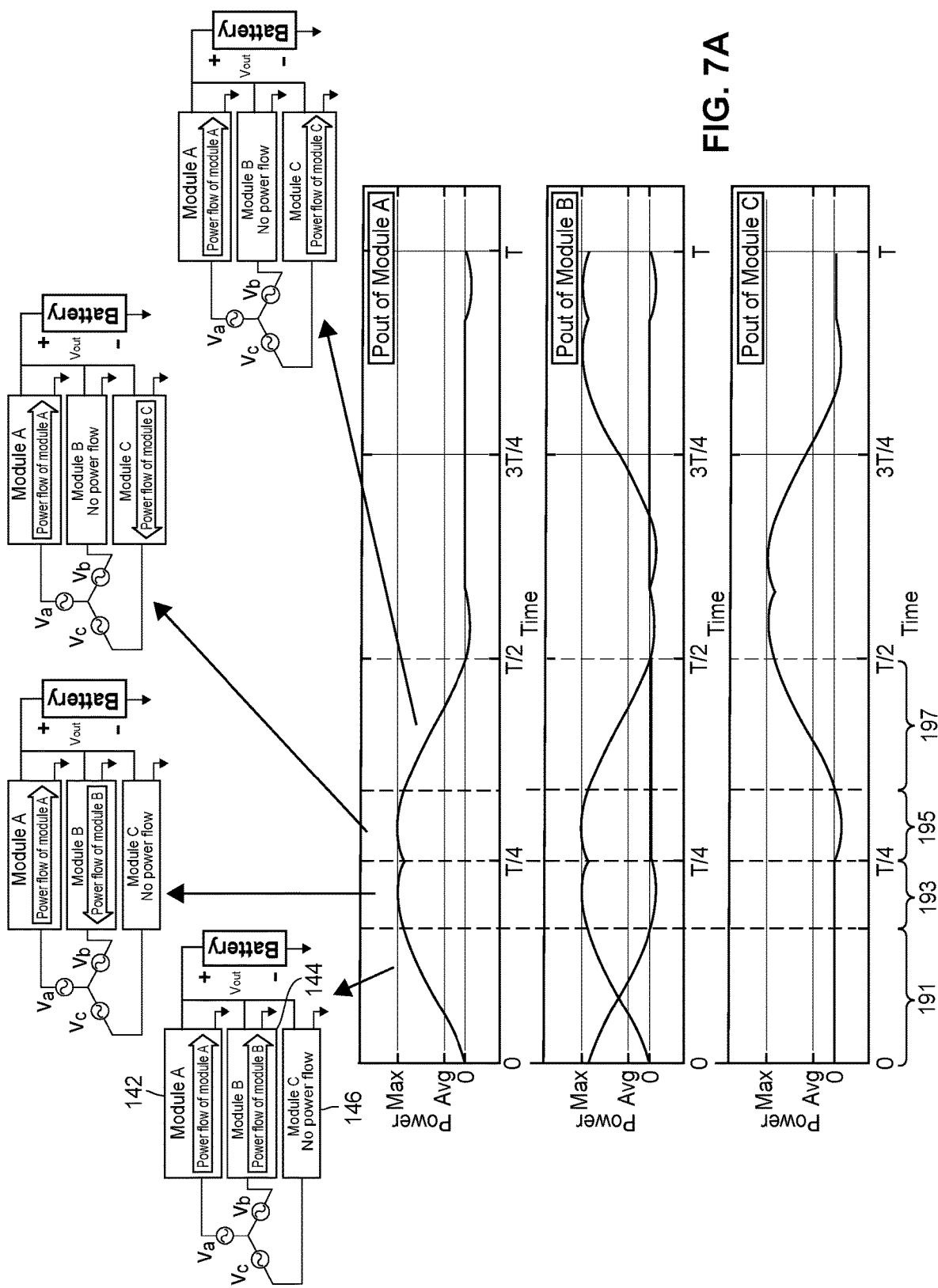
FIG. 7A is a graph showing the power output of each of the three sub-modules using discontinuous modulation according the present description.
Figure 7B:
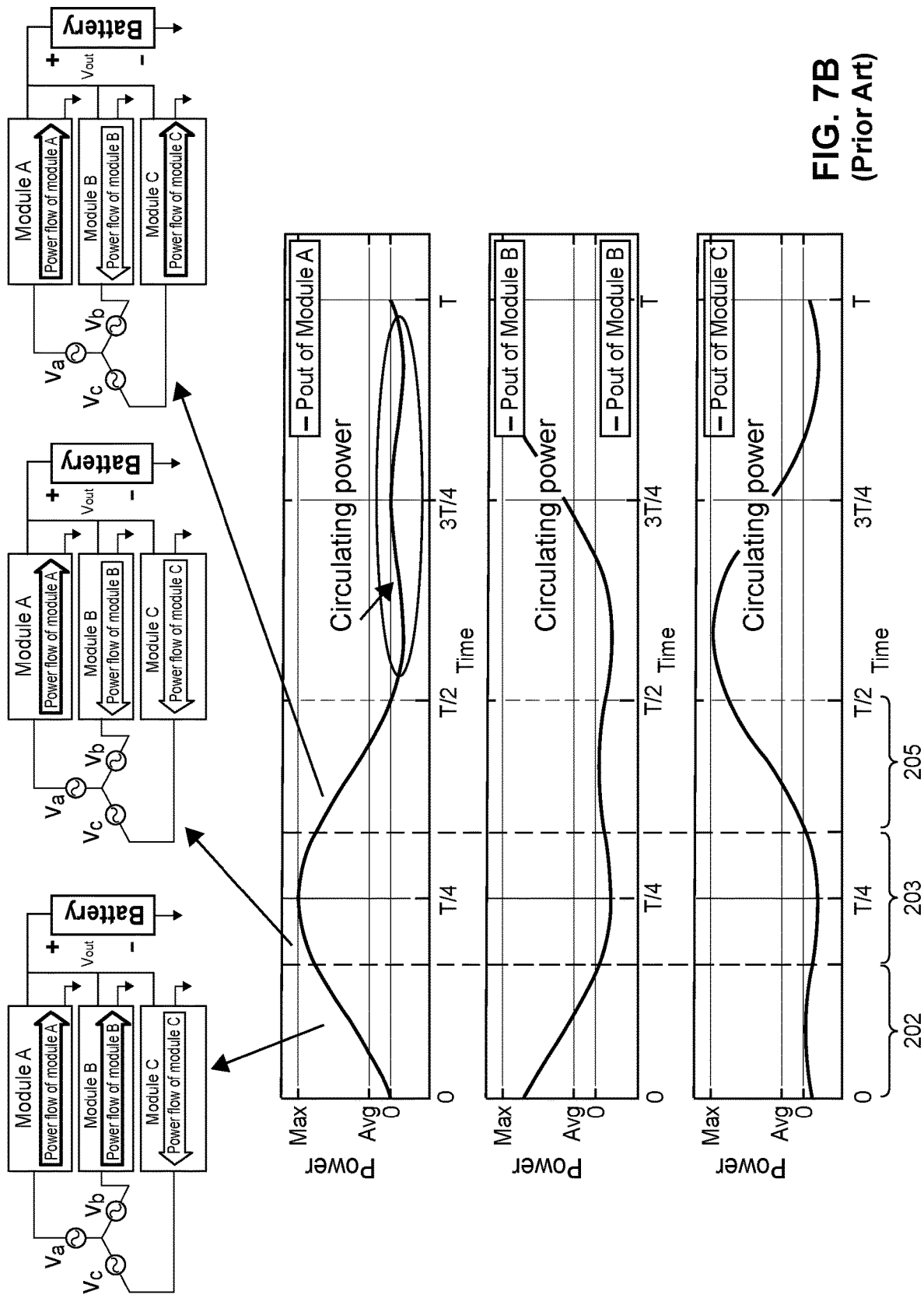
FIG. 7B is a graph showing the power output of each of three sub-modules using continuous modulation according to the prior art.

Similarly, turning briefly to FIGS. 7A and 7B, the figures depict the per-module power output signal that results, respectively, from the discontinuous and continuous modulation schemes. In FIG. 7A, the power output of each of the three modules is null during one third of the respective line cycle. At any given point in the cycle of each of the phases, one of the modules has no power flow through it, decreasing the circulating power. As depicted in FIG. 7A, during a first portion 191 (i.e., one-sixth) of the cycle, there is no power flow in the sub-module 146 and there is forward power flow in both of the sub-modules 142 and 144; during a second portion 193 (i.e., one twelfth) of the cycle, there is no power flow in the sub-module 146, there is some reverse power flow in the sub-module 144, and there is forward power flow in the sub-module 142; during a third portion 195 (i.e., one twelfth) of the cycle, there is no power flow in the sub-module 144, there is reverse power flow in the sub-module 146, and there is forward power flow in the sub-module 142; during a fourth portion 197 (i.e., one sixth) of the cycle, there is no power flow in the sub-module 144, and there is forward power flow in both of the sub-modules 142 and 146. As should be understood, similar patterns repeat (with power flow in different combinations of the sub-modules 142-146) throughout the remainder of the three-phase cycle. In contrast, in FIG. 7B, the power output of each of the three modules is negative for much of that same one-third of the line cycle, and null for only an instant, resulting in circulating power during that third of the line cycle. At almost every given point in the cycle of each of the phases, each of the modules has some power flow through it, resulting in significant circulating power. As depicted in FIG. 7B, during a first portion 199 (i.e., one-sixth) of the cycle, there is forward power flow two sub-modules and reverse power flow in one of the modules; during a second portion 203 (i.e., one-sixth) of the cycle, there is forward power flow one sub-module and reverse power flow in two of the modules; during a third portion 205 (i.e., one-sixth) of the cycle, there is forward power flow two sub-modules and reverse power flow in one of the modules; and so on. The circulating power in prior art systems represents significant inefficiency.

Returning now to FIGS. 5A and 5B, in embodiments, each of the sub-modules 180 includes one or more inductors 192, 194 to decrease current ripple and, in turn, lower power total harmonic distortion power. The inductor 192 may be coupled between the positive terminal 184 of the input 182 and the soft-switching module, while the inductor 194 may be coupled between the positive terminal 196 of an output 198.

Figure 8A:
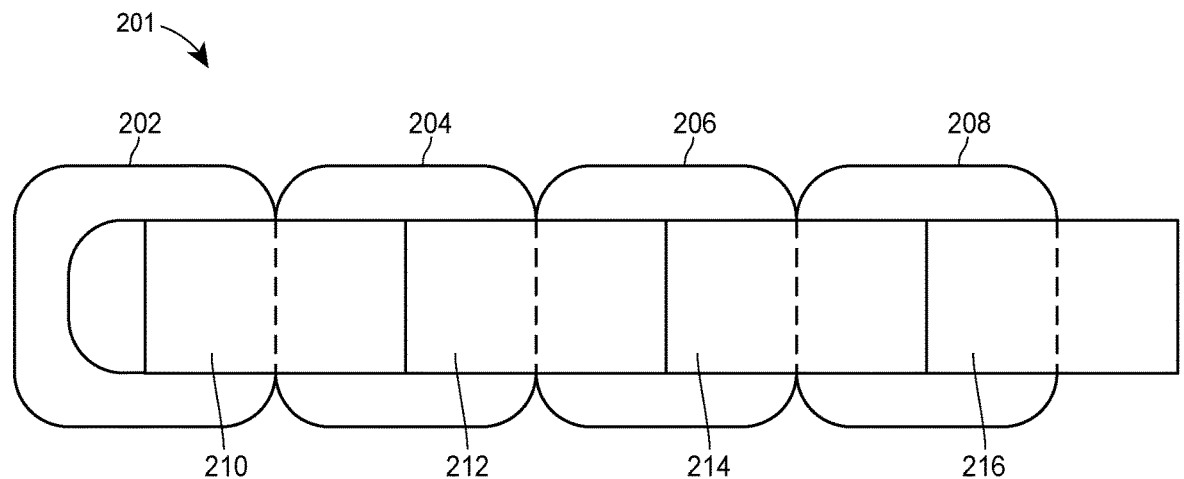
FIG. 8A is an illustration of an example integrated magnetic array.
Figure 8B:
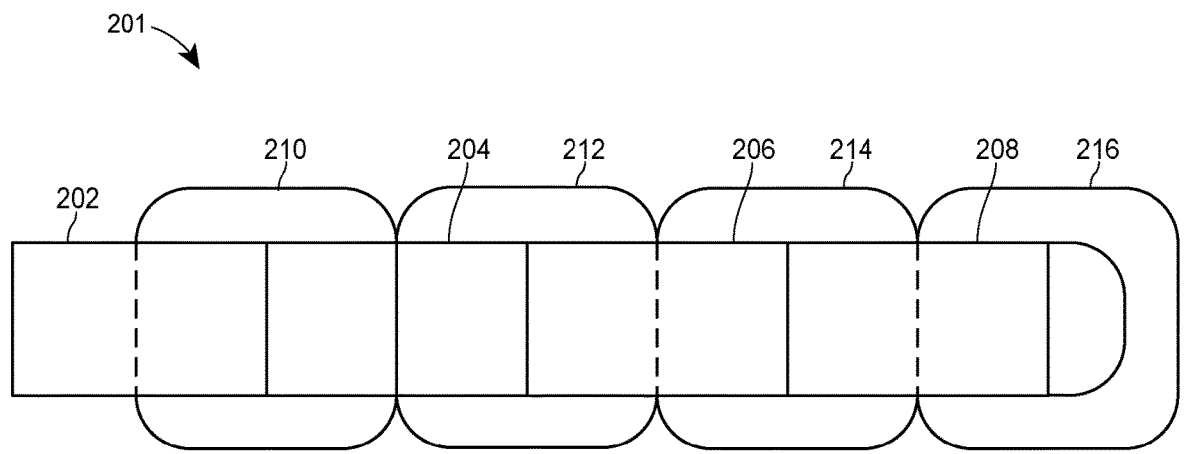
FIG. 8B is an illustration of another view of the example integrated magnetic array of FIG. 8A.

In embodiments, the inductors 192, 194 are structured as an integrated magnetic array, such that each penetrates the core of its neighbor or neighbors, as depicted in FIGS. 8A and 8B. FIGS. 8A and 8B depict an integrated magnetic array 201, in which each of eight inductors 202-216 penetrates the core of its neighboring inductor(s), in a first orientation (FIG. 8A) and in a second orientation (FIG. 8B) rotated 90 degrees about a lengthwise axis of the integrated magnetic array. As can be discerned from FIGS. 8A and 8B, each of the inductors 202-216 passes through the core of its neighboring inductor(s), resulting in at least some of the inductors 202-216 having no airgap. In the array 201, for example, the airgap is eliminated in each of the inductors not at the end of the array 201. That is, there is no airgap in the inductors 204, 206, 208, 210, 212, and 214.

Figure 9A:
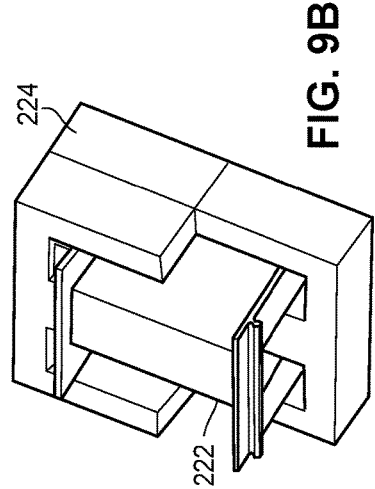
FIG. 9A is a perspective view of a second example of an integrated magnetic array.
Figure 9B:
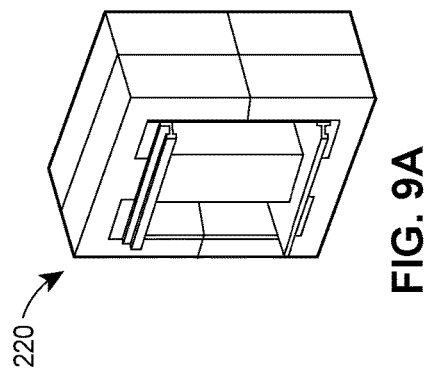
FIG. 9B is a perspective view, with a partial cutaway, of the second example of the integrated magnetic array of FIG. 9A.
Figure 9D:
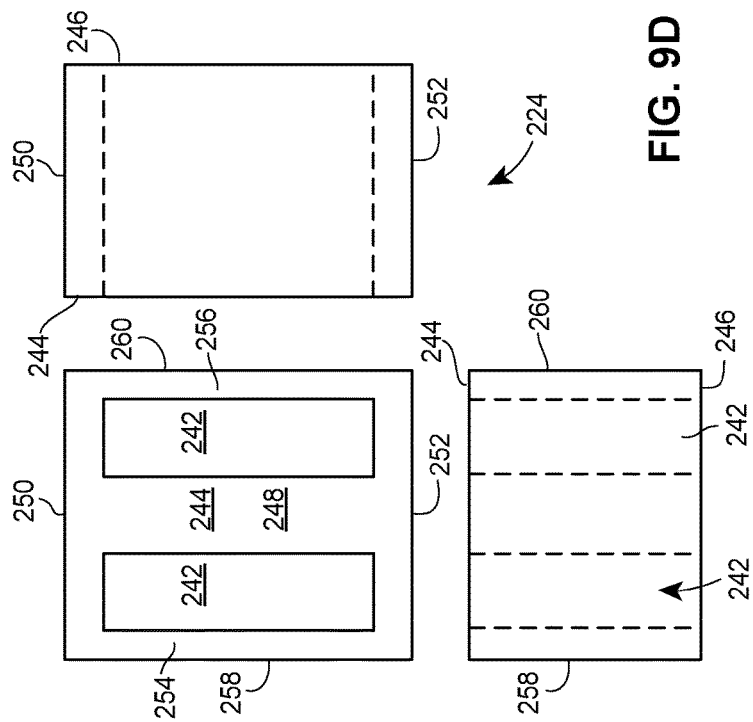
FIG. 9D is a set of isometric views of an outer core of the integrated magnetic array of FIGS. 9A and 9B.
Figure 9C:
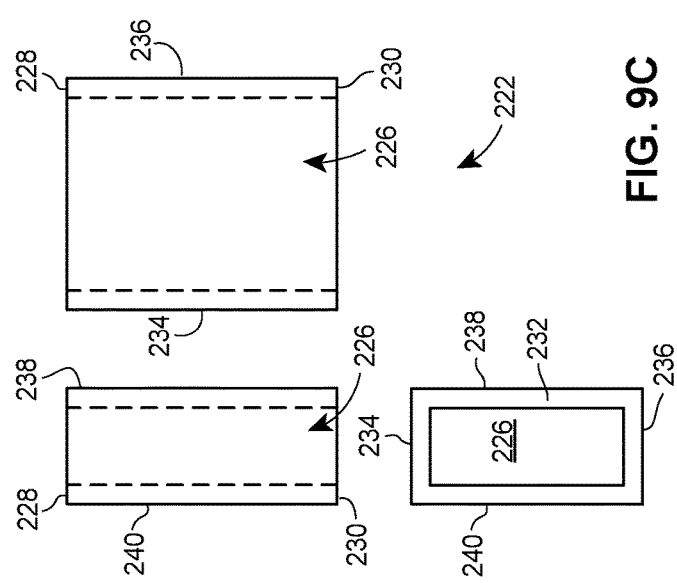
FIG. 9C is a set of isometric views of an inner core of the integrated magnetic array of FIGS. 9A and 9B.
Figure 9E:
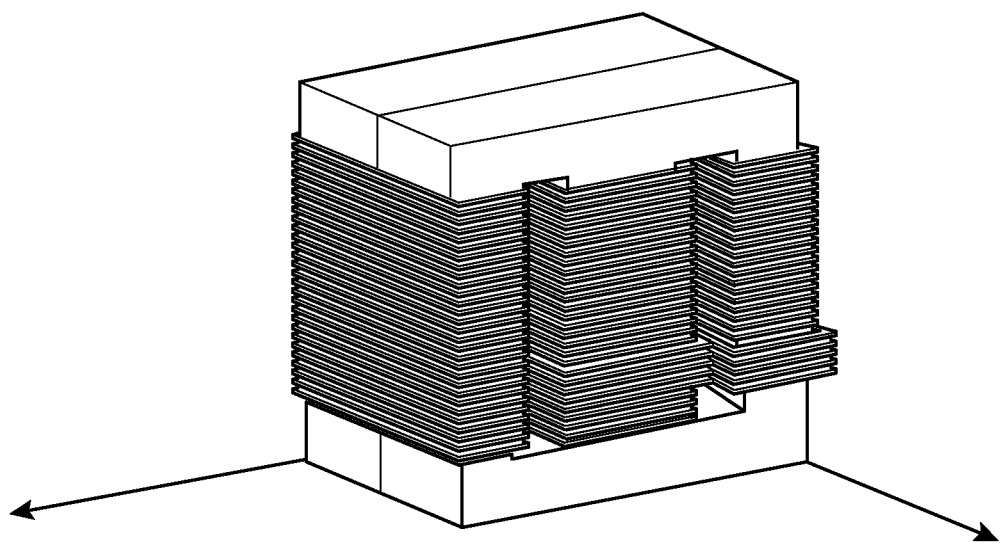
FIG. 9E is a perspective view of the integrated magnetic array of FIGS. 9A-9D, showing coil windings thereon.

In an alternate embodiment, the integrated magnetic array may not result from an arrangement, such as that of the array 201 in FIGS. 8A and 8B, in which the core of each inductor passes through the core of its neighbor, but instead may rely on a novel magnetic core design 220 such as that depicted in FIGS. 9A-9E. FIGS. 9A and 9B show, respectively, the novel core design 220 and a partial cut-away of the novel core design 220. With reference to FIGS. 9A and 9B, the novel core design 220 includes a central core 222 and an outer core 224. The central core 222, in embodiments, is a hollow cuboid (i.e., rectangular prism) structure as depicted in three isometric views in FIG. 9C. The central core 222 has a void 226 extending from a top surface 228 to a bottom surface 230. The void 226 is circumscribed by a wall 232 having a thickness, the outer surface of the wall 232 defining the front 234, back 236, and side surfaces 238, 240 of the central core 222, as depicted in FIG. 9C.

The outer core 224 is similarly a cuboid structure as depicted in three isometric views in FIG. 9D. The outer core 224 has two voids 242 extending from a front surface 244 of the outer core 224 to a back surface 246 of the outer core 224. The two voids 242 cooperate to define a central column 248 extending from the a top surface 250 of the outer core 224 to a bottom surface 252 of the outer core 224, and two outer columns 254 and 256 defined by the voids 242 and sides 258 and 260 of the outer core 224.

The inner core 222 and the outer core 224 are configured and sized such that the void 226 of the inner core 222 fits around the central column 248 of the outer core 224, and such that the sides 238 and 240 of the inner core 222 pass through the voids 242 of the outer core 224, and such that there remains sufficient room for wire windings around the outer columns 254 and 256 of the outer core 224, and around the outer surfaces 234, 236, 238, and 240 of the inner core 224. This configuration is depicted with windings in FIG. 9E.

In embodiments, the inner and outer cores 224, 226 are comprised of a high-permeability magnetic material and, specifically, may be comprised of materials such as a Metglas® material, Finemet®, or other high-performance ferrites. In embodiments, the material from which the inner and outer cores 224, 226 are made result in a flux density exceeding 0.4 T when the applied external magnetic field exceeds 250 A/m, a flux density exceeding 0.8 T when the applied external magnetic field exceeds 500 A/m, and/or a flux density exceeding 1.4 T when the applied external magnetic field exceeds 1500 A/m.

The integrated magnetics described above reduce the size and weight of the magnetics in the device, resulting in a smaller, lighter module than one in which the magnetics comprise discrete parts. Additionally, the use of integrated magnetics reduces ripple current. As should be understood, magnetic (i.e. inductive) elements require metallic coil around a magnetic core. However, as frequency increases, the losses from the core and resistance increase. Softer core (high-permeability) magnetic materials are required to mitigate these losses as frequency increases. However, with softer cores comes increased magnetic saturation, which results in an inductor that more quickly loses its inductive properties. One way to mitigate this type of saturation is with an air gap. However, air gap increases the size of the magnetics. By integrating the magnetics—coupling multiple inductors to the same magnetic core—a softer core material may be employed while still eliminating the air-gap, without degrading performance.

Figure 10:
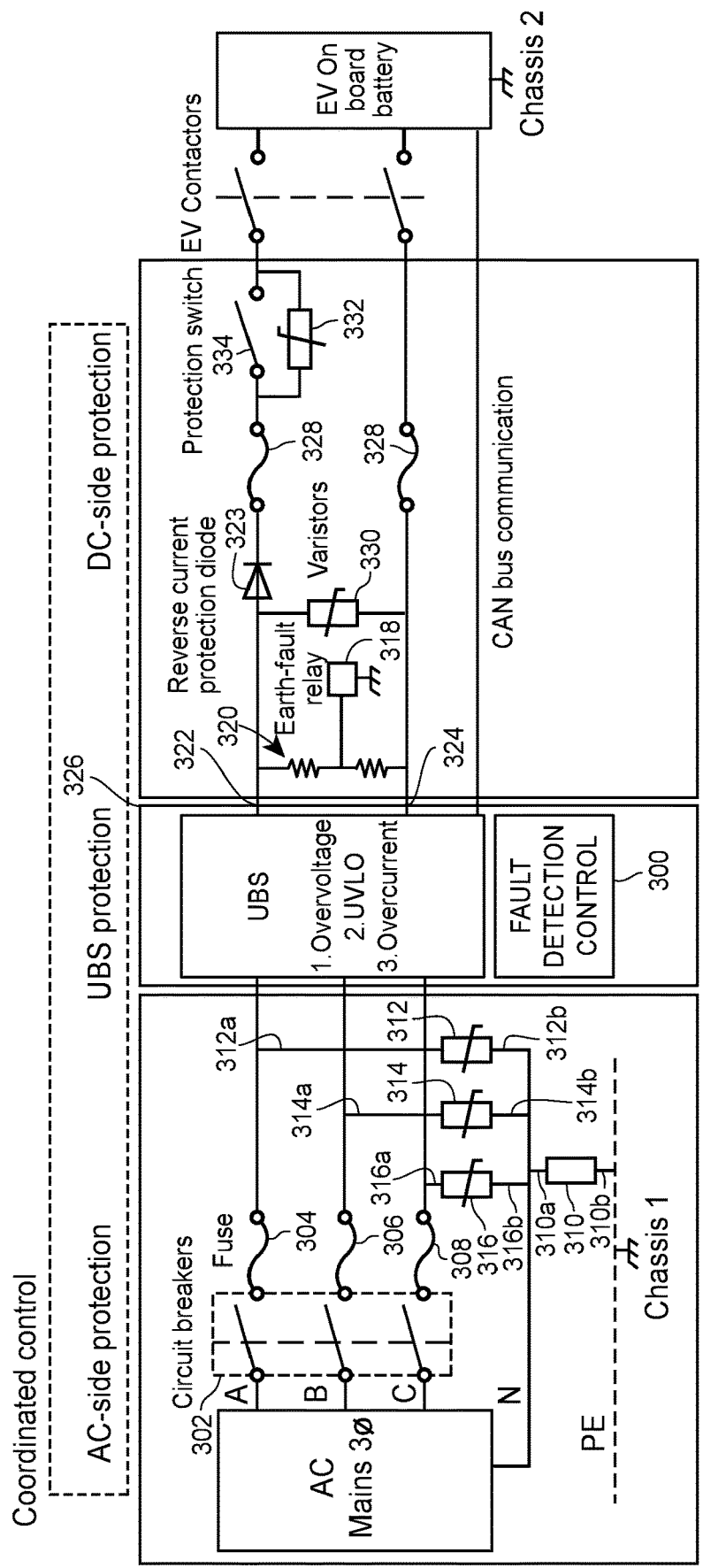
FIG. 10 is a combined block and schematic diagram illustrating various fault detection and mitigation components in accordance with the present description.

In another aspect of various embodiments, the power module 140 and/or the modular charging system 120 includes coordinated control of protective devices in the circuit(s). FIG. 10 is illustrative of these concepts, and depicts AC-side protection (protection between the connection to the AC power source 110 and the sub-modules 142-146), DC-side protection (protection between the sub-modules 142-146 and the battery 130), and power module protection (protection of the circuitry within the power module 140 and the sub-modules 142-146 and providing overvoltage protection, undervoltage lockout protection, and/or overcurrent protection). Additionally, a coordinated control layer embodied in a controller 300 coordinates control between the various protective devices as described below.

The AC-side protection includes, in some embodiments, an AC relay 302 configured to act as a circuit breaker for each phase independently, or all phases together, of the AC power source 110. One or more fuses 304-306—for example, one fuse per phase/line from the AC power source 110—may also be configured between the AC power source 110 and the power module 140. One or more metal-oxide varistors (MOVs) may also be used as AC-side protection in various embodiments. In particular, an MOV 310 may be coupled at a first terminal 310a to the neutral of the AC power source 110 and at a second terminal 310b to the chassis ground of the AC power source 110. Additionally or alternatively, an MOV 312-316 may be coupled, for each phase, at a first terminal 312-316a to the input to the respective sub-module 142-146 and at a second terminal 312-316b to the neutral of the AC power source 110.

The DC-side protection includes, in some embodiments, an earth-fault relay 318. The earth-fault relay 318 may be coupled, via a resistive divide network 320 implemented between terminals 322, 324 of the output 326 of the power module 140. The resistive divide network 320 may facilitate detection of the onset of a one-terminal fault and may cause the earth-fault relay 318 to react accordingly to mitigate the fault. The DC-side protection may also include, in embodiments, a reverse current protection diode 327 coupled at one terminal to the terminal 322 of the output 326 of the power module 140, and electrically coupled at a second terminal, via one or more components, to the positive terminal of the battery 130. Fuses 328 may be coupled between each of the terminals 322 and 324 of the output 326 of the power module 140 and the respective positive and negative terminals of the battery 130. In embodiments, one or more varistors may also be included among the DC-side protection. For example, a varistor 330 may be coupled between the terminals 322 and 324 of the output 326 of the power module 140 and/or a varistor 332 may be coupled (directly or via one or more other components) between the positive terminal of the battery 130 and the terminal 322 of the output 326 of the power module 140. In embodiments, a protective switch 334 is also or alternatively coupled (directly or via one or more other components) between the positive terminal of the battery 130 and the terminal 322 of the output 326 of the power module 140.

The power module protection may include one or more of overvoltage protection, undervoltage lockout protection, and overcurrent protection. In particular, the power module protection may be embodied in a gate driver that drives the switches S1 and S2 in each of the sub-modules. The gate driver includes undervoltage lockout protection, overvoltage protection, and overcurrent protection built into the gate driver package, and include output signals indicating when a protective circuit has been tripped.

A fault detection control module 300 may include various sensors and/or receive various signals from the components in the AC-, DC-, and power module protection, and may control various components in response to the sensed or received signals. For example, in embodiments, the fault detection control module 300 may actuate the AC relay 302 in response to detecting a fault (e.g., an AC-side fault). Similarly, the fault detection control module 300 may actuate the protection switch 334 in response to detecting a fault (e.g., a DC-side fault), or may actuate the earth-fault relay 318 in response to detecting a fault.

Figure 11:
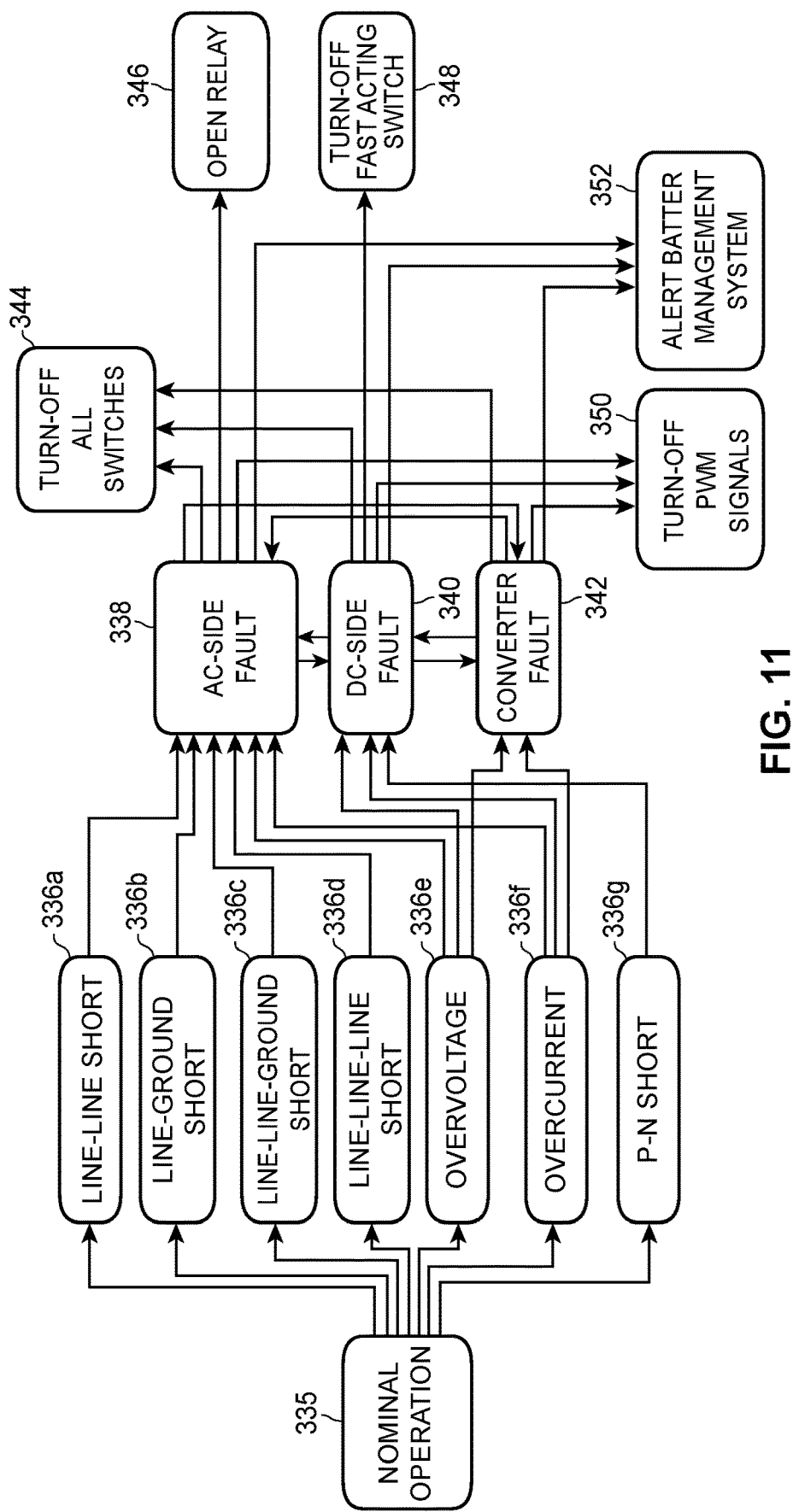
FIG. 11 is a state diagram illustrating an example coordinated fault detection and mitigation strategy.

FIG. 11 is a state diagram illustrating an example coordinated fault detection and mitigation strategy that may be implemented by the control module 300 and the various components described with respect to FIG. 10. A state 335 represents nominal operation of the module and sub-modules. States 336a-g represent various faults that could occur, including: a line-line short (state 336a); a line-ground short (state 336b), a line-line-ground short (state 336c); a line-line-line short (state 336d); an overvoltage condition (state 336e); an overcurrent condition (state 336f); and a P-N short (state 336g). Each of the states 336a-g results in a state representing an AC-side fault (state 338), a state representing a DC-side fault (state 340), and/or a state representing a UBS (converter) fault (state 342). Each of the states 338-342 results in one or more mitigation states. The mitigation states include a state 344 in which all switches are turned off, a state 346 in which the AC relay 302 is opened, a state 348 in which the fast acting switch is turned off, a state 350 in which the pulse-width modulation signals are turned off, and a state 352 in which an alert is transmitted a battery management system to which the presently described system is connected. As can be seen in the state diagram of FIG. 11, AC-side, DC-side, and converter faults result in the state 344; AC-side and converter faults result in the state 346; DC-side faults result in the state 348; AC-side, DC-side, and converter faults result in the state 350; and AC-side, DC-side, and converter faults result in the state 352. In embodiments, receipt at the control module 300 of an indication of any of a DC-side fault, an AC-side fault, or a converter fault will result in the control module 300 outputting a global fault signal that triggers protection components in the AC-side protection, the DC-side protection, and the converter (switching) protection.

The various embodiments contemplated and claimed herein address a number of technical challenges encountered. For instance, use of a traditional MOSFET resulted in high switching losses. A soft-switching scheme utilizing a fast transition SiC JFET module was implemented to mitigate switching loss and increase efficiency. Traditional magnetics (i.e., inductors) are bulky and require a large footprint, resulting in lower power density. The creation of a monolithic unit that encompasses both processing and sensing devices, and the use of a higher switching frequency, combined with an advanced control scheme reduced component dimensions and allowed for an optimized layout that increased power density. The use of integrated magnetics also reduced footprint, while the use of high permeability cores achieved higher inductances with zero airgap decreasing losses and bias level of the magnetics.

As a result of addressing the challenges encountered, the power modules contemplated herein achieve efficiency in excess of 95 percent and, in embodiments, in excess of 98%; achieve power density in excess of 85 W/in$^3$ and, in embodiments power density in excess of 85 W/in$^3$ and, in still further embodiments, power density in excess of 150 W/in$^3$; and achieve specific power in excess of 3.75 kW/kg and, in embodiments, in excess of 5 kW/kg.

Figure 12:
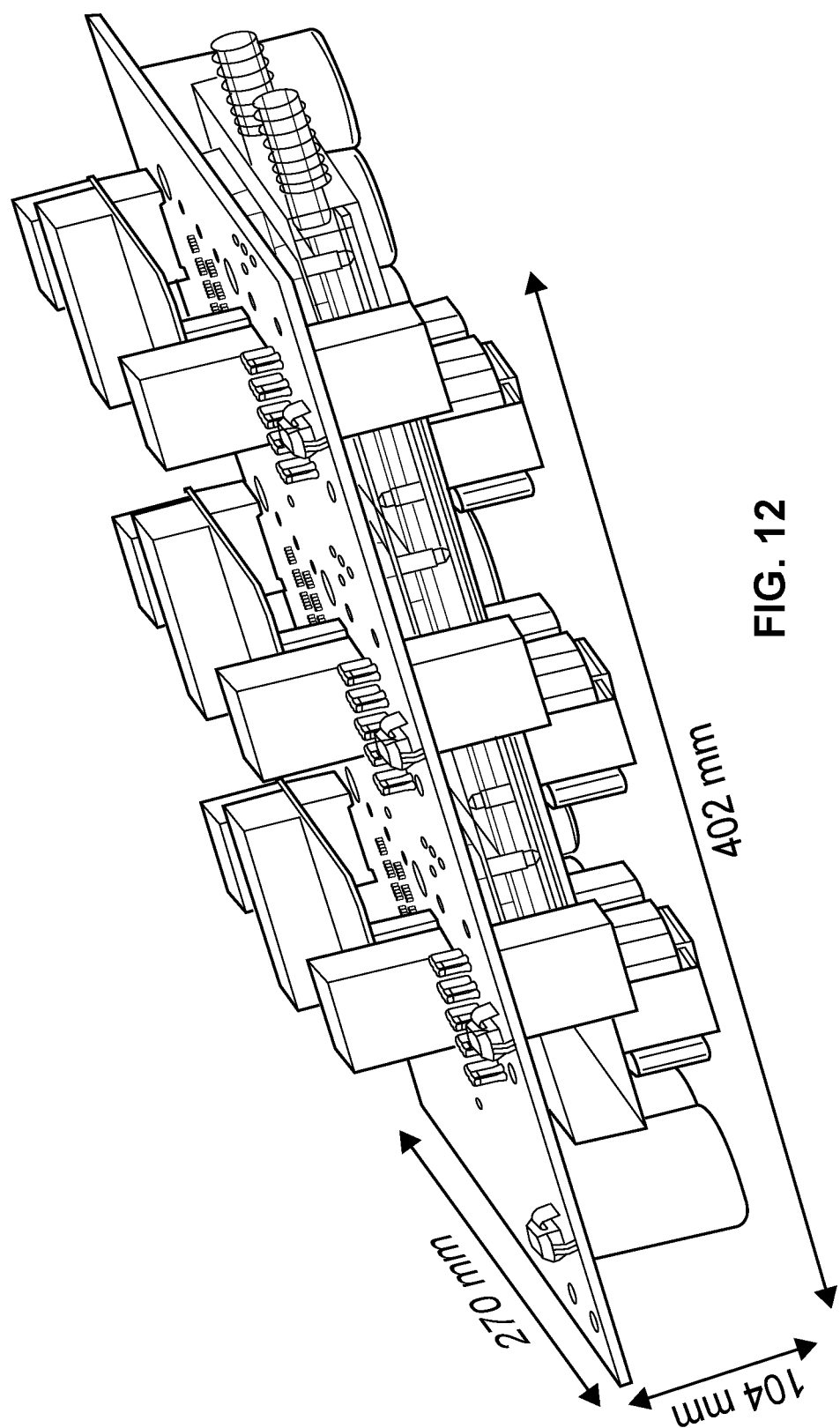
FIG. 12 depicts a computer-aided design (CAD) model of an example power module in accordance with the present description.

FIG. 12 depicts a computer-aided design (CAD) model of an example power module 140 in accordance with the present description. The power module 140 fits in a volume measuring 270 mm×402 mm×104 mm, for a total volume of 11,288 cm$^3$ (less than 0.4 ft$^3$).

In view of the present disclosure it should be recognized that, while described as providing power to a battery, the architecture of the power module 140 lends itself to both battery charging applications and grid-connected inverters, due to both the continuous input and output currents, as well as the symmetrical structure. That is, the device can support bidirectional applications including both grid-to-vehicle (G2V) operation and vehicle-to-grid (V2G) operation.

Additional Aspects

The following list of aspects reflects a variety of the embodiments explicitly contemplated by the present disclosure. Those of ordinary skill in the art will readily appreciate that the aspects below are neither limiting of the embodiments disclosed herein, nor exhaustive of all of the embodiments conceivable from the disclosure above, but are instead meant to be exemplary in nature.

1. A modular system for charging a battery, the system comprising: a power module comprising a first sub-module, a second sub-module, and a third sub-module; each of the first, second, and third sub-modules: (i) configured to receive a respective first, second, or third phase of a three-phase alternating current (AC) signal; (ii) comprising a respective semiconductor device configured to discontinuously modulate the received respective first, second, or third phase of the three-phase AC signal by limiting, to a respective first, second, or third portion of a line cycle, an active duration of the received respective first, second, or third phase of the three-phase AC signal and convert the received respective first, second, or third phase of the three-phase AC signal to direct current (DC); and (iii) provide the DC to a battery to charge the battery.

2. The system of aspect 1, wherein each of the first, second, and third portions of the respective line cycles comprises two thirds of the respective line cycle.

3. The system of either aspect 1 or aspect 2, further comprising a current sensor configured to sum current flowing into and out of the battery; wherein the power module is further configured to cease supplying the DC to the battery if the sum of the current flowing into and out of the battery is higher than a preset value.

4. The system of any one of aspects 1 to 3, further comprising a reverse current protection diode configured to: (i) allow current to flow from the power module to the battery, and (ii) prevent current from flowing from the battery to the power module.

5. The system of any one of aspects 1 to 4, further comprising a protection switch: (i) between the power module and the battery, and (ii) configured to connect and disconnect the power module and battery.

6. The system of any one of aspects 1 to 5, wherein none of the first, second, or third sub-modules includes a transformer transforming a voltage of the respective first, second, or third phase of the AC signal.

7. The system of any one of aspects 1 to 6, wherein each of the first, second, and third sub-modules: comprises a respective primary side inductor with an input configured to receive electrical current of the respective first, second, or third phase of the AC signal; is configured to pass electrical current from an output of the respective primary side inductor through a respective capacitor to an input of a respective secondary side inductor; and provide current from an output of the respective secondary side inductor as part of the DC to charge the battery.

8. The system of any one of aspects 1 to 7, wherein each of the first, second, and third sub-modules comprises an inductor made of a high permeability material.

9. The system of any one of aspects 1 to 8, wherein each of the first, second, and third sub-modules comprises an inductor made of a metglas.

10. The system of any one of aspects 1 to 9, wherein each of the first, second, and third sub-modules comprises an inductor with no airgap in a core of the inductor.

11. The system of any one of aspects 1 to 9, wherein each of the first, second, and third sub-modules comprises an inductor with a solid core.

12. The system of any one of aspects 1 to 11, wherein each of the first, second, and third sub-modules comprises an inductor with a toroid core.

13. The system of any one of aspects 1 to 12, wherein: each of the first, second, and third sub-modules comprises a respective primary side inductor and a respective primary side capacitor, wherein each of the first, second, and third sub-modules is configured to receive the respective first, second or third phase of the three-phase AC signal with both the respective primary side inductor and the respective primary side capacitor; the respective semiconductor device is a first respective semiconductor device coupled with the respective primary side inductor and a first side of a respective intermediate capacitor; and each of the first, second, and third sub-modules further comprises: (i) a second respective semiconductor device coupled with a second end of the respective intermediate capacitor and a respective secondary side inductor, and (ii) a respective secondary side capacitor coupled with the secondary side inductor.

14. The system of any one of aspects 1 to 13, wherein: the first sub-module is configured to discontinuously modulate the received first phase of the three phase AC signal by performing high frequency switching of the semiconductor device of the first sub-module; the second sub-module is configured to discontinuously modulate the received second phase of the three phase AC signal by performing high frequency switching of the semiconductor device of the second sub-module; and the third sub-module is configured to discontinuously modulate the received third phase of the three phase AC signal by performing low frequency switching of the semiconductor device of the third sub-module.

15. A method for charging a battery, the method comprising: receiving at a power module a three-phase alternating current (AC) signal; limiting to a respective first, second, and third portion of a line cycle, for each phase of the three-phase AC signal, an active duration power of a respective semiconductor device in the UBS to discontinuously modulate the received AC signal and covert the received AC signal to direct current (DC); and providing the DC to charge the battery.

16. The method of aspect 15, wherein receiving a three-phase AC signal comprises receiving each phase of the three-phase AC signal at a respective first, second, or third sub-module of the power module.

17. The method of either aspect 15 or 16, wherein each of the first portion, second portion, and third portion of the line cycle comprises two thirds of the line cycle.

18. The method of any one of aspects 15 to 17, further comprising: summing current flowing into and out of the battery using a current sensor; determining whether the sum of the current flowing into and out of the battery is higher than a preset value; and ceasing supplying the DC to the battery in response to a determination that the sum of the current flowing into and out of the battery is higher than a preset value.

19. The method of any one of aspects 15 to 18, further comprising: allowing current to flow from the power module to the battery with a reverse current protection diode; and preventing current from flowing from the battery to the power module with the reverse protection diode.

20. The method of any one of aspects 15 to 19, further comprising using a protection switch connected between the power module and the battery to prevent current from flowing to the battery in response to an overcurrent condition.

21. The method of any one of aspects 16 to 20, wherein none of the first sub-module, the second sub-module, or the third sub-module includes a transformer transforming a voltage of the respective first, second, or third phase of the AC signal.

22. The method of any one of aspects 16 to 21, wherein: receiving the three-phase AC signal comprises receiving, with a respective input of a respective primary side inductor of each of the first, second, and third sub-modules, electrical current of a respective first, second, and third phase of the AC signal; the method further comprises passing electrical current from a respective outputs of the respective primary side inductors through respective capacitors to respective inputs of respective secondary side inductors; and providing the DC to charge the battery comprises providing electrical current from respective outputs of the respective secondary side inductors to the battery.

23. The method of any one of aspects 16 to 22, wherein each of the first, second, and third sub-modules comprises an inductor made of a high permeability material.

24. The method of any one of aspects 16 to 22, wherein each of the first, second, and third sub-modules comprises an inductor made of a metglas.

25. The method of any one of aspects 16 to 24, wherein each of the first, second, and third sub-modules comprises an inductor with no airgap in a core of the inductor.

26. The method of any one of aspects 16 to 24, wherein each of the first, second, and third sub-modules comprises an inductor with a solid core.

27. The method of any one of aspects 16 to 24, wherein each of the first, second, and third sub-modules comprises an inductor with a toroid core.

28. The method of any one of aspects 16 to 27, wherein: each of the first, second, and third sub-modules comprises a respective primary side inductor and a respective primary side capacitor, wherein the receiving the respective phase of AC signal comprises receiving the respective phase of AC signal with both the respective primary side inductor and the respective primary side capacitor; the respective semiconductor devices are first respective semiconductor devices of each of the first, second, and third sub-modules, and wherein the first respective semiconductor devices are coupled with the respective primary side inductor and a first side of a respective intermediate capacitor; and each of the first, second, and third sub-modules further comprises: (i) a second respective semiconductor device coupled with a second end of the respective intermediate capacitor and a respective secondary side inductor, and (ii) a respective secondary side capacitor coupled with the respective secondary side inductor.

29. The method of any one of aspects 15 to 28, wherein: the discontinuous modulation of the first phase of the three phase AC signal comprises high frequency switching of the first semiconductor device; the discontinuous modulation of the second phase of the three phase AC signal comprises high frequency switching of the second semiconductor device; and the discontinuous modulation of the third phase of the three phase AC signal comprises low frequency switching of the third semiconductor device.

30. The method of any one of aspects 15 to 29, wherein the power module is a first power module, and the method further comprises: receiving at a second power module the three-phase AC signal; limiting to a respective first, second, and third portion of the line cycle, for each phase of the three-phase AC signal, an active duration power of a respective semiconductor device in the second power module to discontinuously modulate the received AC signal and covert the received AC to direct current (DC); and providing the DC to charge the battery.

31. A power module comprising: an input configured to receive alternating current (AC) from a three-phase AC power source; a first sub-module configured to receive a first phase of an AC signal provided by the AC power source, and to modulate first phase of the AC signal to provide a first output signal; a second sub-module configured to receive a second phase of the AC signal provided by the AC power source, and to modulate second phase of the AC signal to provide a second output signal; a third sub-module configured to receive a third phase of the AC signal provided by the AC power source, and to modulate third phase of the AC signal to provide a third output signal; and an output configured to deliver to a battery, as a direct current (DC) output, the combined first, second, and third output signals, wherein the first, second, and third sub-modules are configured as a differential mode converter.

32. A power module according to aspect 31, wherein the first, second, and third sub-modules cooperate to perform single stage conversion of the AC signal to the DC signal.

33. A power module according to either aspect 31 or aspect 32, wherein the first, second, and third sub-modules cooperate to convert the AC signal to the DC signal without the use of a transformer.

34. A power module according to any one of aspects 31 to 33, wherein each of the first, second, and third sub-modules comprises a semiconductor switching device modulating the respective phase of the AC signal.

35. A power module according to aspect 35, wherein the semiconductor switching device is a SiC junction gate field-effect transistor (JFET) cascade device.

36. A power module according to any one of aspects 31 to 35, wherein each of the first, second, and third sub-modules is configured to modulate the respective phase of the AC signal using a discontinuous modulation scheme.

36A. A power module according to any one of aspects 31 to 36, wherein each of the first, second, and third sub-modules is configured to modulate the respective phase of the AC signal such that high-frequency switching is performed only during ⅔ of the respective line cycle.

37. A power module according to any one of aspects 31 to 36A, wherein line inductance is integrated into each of the first, second, and third sub-modules.

38. A power module according to aspect 37, wherein the line inductance comprises an air-gapless integrated magnetic array.

39. A power module according to aspect 37, wherein the integrated magnetic array comprises a plurality of discrete inductors each penetrating the core of its neighbor or neighbors.

40. A power module according to aspect 38 or aspect 39, wherein the integrated magnetic array comprises a plurality of discrete inductors coupled in a manner resulting in elimination of any airgap in the cores of the discrete inductors.

41. A power module according to any one of aspects 37 to 40, wherein the line inductance comprises one or more inductors having a high-permeability core material.

42. A power module according to aspect 41, wherein the high-permeability core material results in a flux density exceeding 0.4 T when the applied external magnetic field exceeds 250 A/m.

43. A power module according to aspect 41, wherein the high-permeability core material results in a flux density exceeding 0.8 T when the applied external magnetic field exceeds 500 A/m.

44. A power module according to aspect 41, wherein the high-permeability core material results in a flux density exceeding 1.4 T when the applied external magnetic field exceeds 1500 A/m.

45. A power module according to any one of aspects 31 to 44, further comprising fault response circuitry configured to coordinate a fault control response of AC-side protection, DC-side protection, and protection of switching components performing the modulation.

45A. A power module according to aspect 45, wherein the fault response circuitry comprises: first protection components configured to monitor the switching components, to cause the switching components to stop operating when over-voltage, undervoltage, and/or overcurrent conditions are detected or when a global fault signal is detected, and to output a first fault signal when any of the over-voltage, undervoltage, and/or overcurrent condition is detected; second protection components configured to monitor the AC-side of the power module between the AC power source and the switching components of the first, second, and third sub-modules, to cause one or more AC-side protection components to activate when an AC-side fault is detected or when the global fault signal is detected, and to output a second fault signal when the AC-side fault is detected; third protection components configured to monitor the DC-side of the power module between the first, second, and third sub-modules and the battery, to cause one or more DC-side protection components to activate when a DC-side fault is detected or when the global fault signal is detected, and to output a third fault signal when the DC-side fault is detected; coordination circuitry configured to receive the first, second, and third fault signals, and to output the global fault signal when any of the first, second, or third fault signals is detected.

46. A power module according to aspect 45 or aspect 45A, wherein the AC-side protection comprises, for each phase of the three-phase AC power source, an AC relay configured as a circuit breaker.

47. A power module according to aspects 45, 45A, or 46, wherein the AC-side protection comprises, for each phase of the three-phase AC power source, a fuse.

48. A power module according to any one of aspects 45 to 47, wherein the AC-side protection comprises, for each phase of the three-phase AC power source, a metal-oxide varistor coupled at a first terminal to the respective line voltage for the phase and at a second terminal to a chassis ground of the AC power source.

49. A power module according to any one of aspects 45 to 48, wherein the DC-side protection comprises an earth-fault relay.

50. A power module according to any one of aspects 45 to 49, wherein the DC-side protection comprises a reverse current protection diode.

51. A power module according to any one of aspects 45 to 50, wherein the Dc-side protection comprises a metal-oxide varistor coupled to a first terminal of the DC output and to a second terminal of the DC output.

52. A power module according to any one of aspects 45 to 51, wherein the conversion system protection comprises overvoltage protection.

53. A power module according to any one of aspects 45 to 52, wherein the conversion system protection comprises undervoltage lockout protection.

54. A power module according to any one of aspects 45 to 53, wherein the conversion system protection comprises overcurrent protection.

55. A power module according to any one of aspects 31 to 54, wherein the efficiency of the power module exceeds 95 percent and, in particular, exceeds 98 percent.

56. A power module according to any one of aspects 31 to 55, wherein the power density of the power module exceeds 87 W/in$^3$ and, in particular, exceeds 100 W/in$^3$, and more particularly, exceeds 150 W/in$^3$.

57. A power module according to any one of aspects 31 to 56, wherein the specific power of the power module exceeds 3.75 kW/kg and, in particular, exceeds 5 kW/kg.

We claim:

1. A power module comprising:
    an input configured to receive alternating current (AC) from a three-phase AC power source;
    a first sub-module configured to receive a first phase of an AC signal provided by the AC power source, and to modulate the first phase of the AC signal to provide a first output signal;
    a second sub-module configured to receive a second phase of the AC signal provided by the AC power source, and to modulate the second phase of the AC signal to provide a second output signal;
    a third sub-module configured to receive a third phase of the AC signal provided by the AC power source, and to modulate the third phase of the AC signal to provide a third output signal; and
    an output configured to deliver to a battery, as a direct current (DC) output, a signal comprising a combination of the first, second, and third output signals,
    wherein the first, second, and third sub-modules are configured in a differential mode converter, and
    wherein each of the first, second, and third sub-modules is configured to modulate the respective phase of the AC signal such that high-frequency switching is performed only during ⅔ of the respective line cycle.

2. A power module according to claim 1, wherein the first, second, and third sub-modules cooperate to perform single stage conversion of the AC signal to the DC signal.

3. A power module according to claim 1, wherein the first, second, and third sub-modules cooperate to convert the AC signal to the DC signal without the use of a transformer.

4. A power module according to claim 1, wherein each of the first, second, and third sub-modules comprises a semiconductor switching device modulating the respective phase of the AC signal.

5. A power module according to claim 4, wherein the semiconductor switching device is a wide- or narrow-bandgap insulated gate device.

6. A power module according to claim 1, wherein each of the first, second, and third sub-modules is configured to modulate the respective phase of the AC signal using a discontinuous modulation scheme.

7. A power module according to claim 1, wherein line inductance is integrated into each of the first, second, and third sub-modules.

8. A power module according to claim 7, wherein the line inductance comprises an air-gapless integrated magnetic array.

9. A power module according to claim 8, wherein the integrated magnetic array comprises a plurality of discrete inductors each penetrating a core of its neighbor or neighbors.

10. A power module according to claim 8, wherein the integrated magnetic array comprises a plurality of discrete inductors coupled in a manner resulting in elimination of any airgap in the cores of the discrete inductors.

11. A power module according to claim 7, wherein the line inductance comprises one or more inductors having a high-permeability core material.

12. A power module according to claim 1, further comprising fault response circuitry configured to coordinate a fault control response of AC-side protection, DC-side protection, and protection of switching components performing the modulation.

13. A power module according to claim 12, wherein the fault response circuitry comprises:
    first protection components configured to monitor the switching components, to cause the switching components to stop operating when over-voltage, undervoltage, and/or overcurrent conditions are detected or when a global fault signal is detected, and to output a first fault signal when any of the over-voltage, undervoltage, and/or overcurrent condition is detected;
    second protection components configured to monitor the AC-side of the power module between the AC power source and the switching components of the first, second, and third sub-modules, to cause one or more AC-side protection components to activate when an AC-side fault is detected or when the global fault signal is detected, and to output a second fault signal when the AC-side fault is detected;
    third protection components configured to monitor the DC-side of the power module between the first, second, and third sub-modules and the battery, to cause one or more DC-side protection components to activate when a DC-side fault is detected or when the global fault signal is detected, and to output a third fault signal when the DC-side fault is detected;
    coordination circuitry configured to receive the first, second, and third fault signals, and to output the global fault signal when any of the first, second, or third fault signals is detected.

14. A power module according to claim 13, wherein the AC-side protection comprises, for each phase of the three-phase AC power source, an AC relay configured as a circuit breaker.

15. A power module according to claim 13, wherein the AC-side protection comprises, for each phase of the three-phase AC power source, a fuse.

16. A power module according to claim 13, wherein the DC-side protection comprises one or more of the group consisting of: an earth-fault relay a reverse current protection diode, and a metal-oxide varistor coupled to a first terminal of the DC output and to a second terminal of the DC output.

17. A power module according to claim 13, wherein the conversion system protection comprises one or more of the group consisting of: overvoltage protection, undervoltage lockout protection, and overcurrent protection.

18. A power module according to claim 12, wherein the AC-side protection comprises, for each phase of the three-phase AC power source, a metal-oxide varistor coupled at a first terminal to the respective line voltage for the phase and at a second terminal to a chassis ground of the AC power source.

19. A power module according to claim 1, wherein the efficiency of the power module exceeds 95 percent.

* * * * *